US011964557B2

(12) United States Patent
Houser

(10) Patent No.: US 11,964,557 B2
(45) Date of Patent: Apr. 23, 2024

(54) CLUTCH ASSEMBLY AND METHOD FOR OPERATION OF THE CLUTCH ASSEMBLY

(71) Applicant: Dana Heavy Vehicle Systems Group, LLC, Maumee, OH (US)

(72) Inventor: Jordan M. Houser, Sylvania, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 11 days.

(21) Appl. No.: 17/806,239

(22) Filed: Jun. 9, 2022

(65) Prior Publication Data

US 2023/0406096 A1 Dec. 21, 2023

(51) Int. Cl.
| | |
|---|---|
| *B60K 17/35* | (2006.01) |
| *B60K 23/08* | (2006.01) |
| *F16D 13/74* | (2006.01) |
| *F16D 25/0638* | (2006.01) |
| *F16D 25/10* | (2006.01) |
| *F16H 48/22* | (2006.01) |
| *F16H 48/295* | (2012.01) |

(52) U.S. Cl.
CPC .......... *B60K 17/35* (2013.01); *B60K 23/0808* (2013.01); *F16D 13/74* (2013.01); *F16D 25/0638* (2013.01); *F16H 48/22* (2013.01); *F16H 48/295* (2013.01); *F16D 25/10* (2013.01)

(58) Field of Classification Search
CPC ......... B60K 17/35; B60K 23/08; F16D 13/74; F16D 25/0638; F16D 13/00–13/76
See application file for complete search history.

(56) References Cited

U.S. PATENT DOCUMENTS

| | | | | |
|---|---|---|---|---|
| 4,187,936 A | * | 2/1980 | Davenport .......... | F16D 25/0638 254/350 |
| 5,014,841 A | * | 5/1991 | Gillespie .................. | F16D 43/12 192/103 A |
| 5,327,793 A | * | 7/1994 | Hayasaka .............. | B63H 20/20 74/423 |
| 5,709,130 A | * | 1/1998 | Suzuki ................... | B63H 23/30 74/378 |
| 7,303,451 B1 | * | 12/2007 | Amici ................. | F16H 63/3026 74/323 |
| 8,025,137 B2 | | 9/2011 | Sasaki et al. | |
| 10,451,146 B2 | * | 10/2019 | Tseng ...................... | F16D 25/10 |
| 11,181,153 B2 | * | 11/2021 | Sakazaki ................ | B60K 23/04 |

(Continued)

FOREIGN PATENT DOCUMENTS

| | | |
|---|---|---|
| CN | 213197120 U | 5/2021 |
| EP | 1643149 A1 | 4/2006 |

*Primary Examiner* — Tinh Dang

(74) *Attorney, Agent, or Firm* — McCoy Russell LLP

(57) ABSTRACT

A transmission system and a method for operation of said transmission is provided. The transmission system includes a first friction clutch with a first set of discs splined to a shaft and a second set of discs splined to an inner circumference of a first gear. The system further includes a first hydraulic passage extending through the shaft and including an outlet in the shaft that directly supplies a lubricant to the first and second sets of discs during transmission system operation, where the first gear includes outer teeth that are positioned circumferentially around the first gear outward from the first and second sets of discs and is designed to mesh with a second gear in the transmission system.

16 Claims, 2 Drawing Sheets

(56) References Cited

U.S. PATENT DOCUMENTS

| | | | |
|---|---|---|---|
| 11,207,962 B2 * | 12/2021 | Engerman | F16H 37/042 |
| 11,621,606 B2 * | 4/2023 | Devaraj | F16H 57/0473 |
| | | | 310/83 |
| 2010/0243396 A1 | 9/2010 | Mizuno et al. | |
| 2020/0362924 A1 * | 11/2020 | Desing | F16D 25/083 |

* cited by examiner

CLUTCH ASSEMBLY AND METHOD FOR OPERATION OF THE CLUTCH ASSEMBLY

TECHNICAL FIELD

The present disclosure relates to a clutch assembly that is arranged within a gear of a transmission.

BACKGROUND AND SUMMARY

Clutch packs are used in transmissions to enable power flow between gears to be modulated during shift events for smooth torque handovers. Clutch packs however take up a significant amount of space in gear trains and can have a larger profile than other types of clutches, such as dog clutches. As such, previous transmission designers have been faced with undesirable tradeoffs between the size of the clutch envelope and shifting performance.

US 2010/0243396 A1 to Mizuno et al. teaches multiple hydraulic clutch mechanisms in a transmission for an internal combustion engine. In the transmission a gear interposes the hydraulic clutches. In these clutches, friction discs are attached to an outer clutch enclosure.

The inventors have recognized several drawbacks with Mizuno's clutches. For instance, the clutch envelope in the transmission is space inefficient and may impose space constraints on surrounding vehicle components. As such, Mizuno's clutches may be incompatible in certain vehicle platforms such as those with space constrained gearboxes.

The inventors have recognized the aforementioned issues and developed a transmission system. The transmission system includes a first friction clutch with a first set of discs splined to a shaft and a second set of discs splined to an inner circumference of a first gear. The transmission system further includes a hydraulic passage that extends through the shaft and includes an outlet in the shaft that directly supplies a lubricant to the first and second sets of discs during transmission system operation. Further, in the transmission system, the first gear includes outer teeth that are positioned circumferentially around the first gear outward from the first and second sets of discs and is designed to mesh with a second gear in the transmission system. In this way, the clutch is space efficiently incorporated into the transmission. Further, the clutch is effectively lubricated via an internally routed lubrication channel.

The transmission system further includes, in one example, a bearing coupled to the shaft and including an axial side that is adjacent to an axial side of the first friction clutch. The bearing includes a shield on an outer axial side. Positioning the bearing next to the friction clutch and with this shield arrangement allows the lubricant pressure to build up around the clutch to facilitate effective bearing and clutch lubrication.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A transmission with friction clutches that are incorporated into interior of gears on a shaft that achieves greater space efficiency than previous friction clutches is described herein. To achieve the space efficient clutch envelope, clutch discs are splined to the interior circumferences of the gears, the interior to the gear teeth, and a shaft. The elaborate, the axial length of these clutches are reduced in comparison to previous friction clutches that include an external housing which carries the friction plates. For friction clutch lubrication, fluidly separate lubricant conduits are internally routed through the shaft and include outlets that extend through shafts splines which couple to the clutch discs. Consequently, externally routed lubricant conduits for clutch lubrication can be forgone, if wanted.

Figure 1:
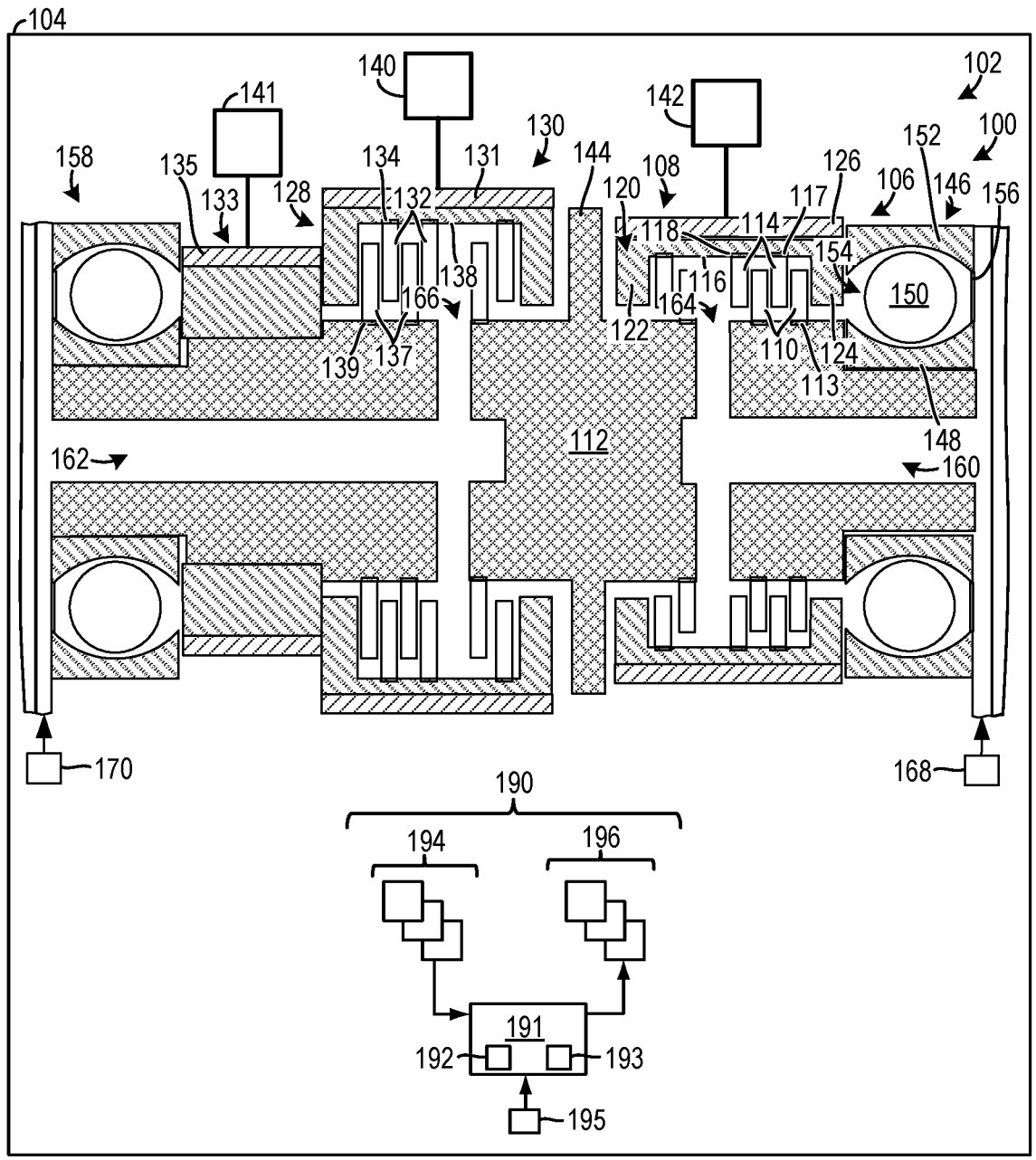
FIG. 1 is an illustration of a transmission system with clutches that include discs that are splined to interiors of gears.

FIG. 1 depicts a transmission system 100 with friction clutches designed to shift a transmission 102 between multiple ratios. The transmission 102 may be included in a vehicle 104 such as an electric vehicle (EV), a combustion engine vehicle, and the like. The vehicle 104 may be a light, medium, or heavy duty vehicle.

The transmission system 100 further includes a first friction clutch 106. A friction clutch, as described herein, is a clutch that includes two sets of discs (e.g., plates) designed to frictionally engage and disengage one another while the clutch is opened and closed. As such, the amount of torque transferred through the clutch may be modulated depending on the degree of plate engagement.

The first friction clutch 106 is incorporated into a gear 108. To facilitate the nesting of the first friction clutch 106 into the gear 108. The first friction clutch 106 includes a first set of discs 110 splined to a shaft 112 via splines 113 and a second set of discs 114 splined to an inner circumference 116 of the gear 108 via splines 117. The splines in both the gear and the shaft as well as the other splined attachment interfaces includes ridges (e.g., teeth) and grooves that extend along the corresponding component. The ridges and the teeth in these splines may substantially extend in the direction of clutch engagement (e.g., in the y-direction). To elaborate, the splines may have an involute shape, a square shape, or another suitable shape.

Splines 118 in the gear 108 that mate with the splines 117 in the second set of discs 114 are included in a body 120 of the gear 108. In the illustrated example, the body 120 of the gear 108 includes a first wall 122 and a second wall 124 on opposing axial sides of the gear 108. These walls 122, 124 bound the sets of discs 110, 114.

The gear 108 further includes teeth 126 that extend radially outward from the body 120. The body 120 and the teeth 126 of the gear 108, as well as the other gears described herein, may form a continuous (e.g., monolithic) structure. For instance, the teeth 126 and splines 118 in the gear 108 may be machined from single piece of material.

The transmission 102 further includes a second friction clutch 128 incorporated into a gear 130. The second friction clutch 128 again includes one set of discs 132 that are splined to an inner circumference 138 of the gear 130 via splines 134, and another set of discs 137 splined to the shaft 112 via splines 139. The gear 130 includes teeth 131.

Another gear 133 may be coupled (e.g., splined, welded, press-fit, combinations thereof, and the like) to the shaft 112. The gear 133 may function as the input to the shaft 112 during drive operation, in one example. However, in an alternate example, the gear 133 may function as the output of the shaft 112. Still further in other examples, the gear 133 may be omitted from the system and may be replaced with an electric motor or other suitable motive power source. The gear 133 include teeth 135. The gear 133 may therefore mesh with another gear 141.

In the illustrated example, the gear 130 and the gear 108 may have different sizes to enable the transmission to shift between a higher gear ratio and a lower gear ratio. As such, the gear 130 may mesh with another gear 140 which is schematically represented and the gear 108 meshes with a gear 142, which is also schematically represented. Transmission system shifting strategies are further described herein with regard to FIGS. 2-3. The shaft 112 further includes a radial extension 144 that is positioned axially between the first friction clutch 106 and the second friction clutch 128. The radial extension 144 may function to axially delimit the gears 108 and 130.

A first bearing 146 is coupled to the shaft 112. To elaborate, an inner race 148 of the bearing 146 may be press-fit, splined, welded, and/or otherwise mechanically coupled to the shaft 112. The bearing 146 further includes include roller elements 150 (e.g., spherical rollers in the illustrated example, cylindrical rollers, tapered cylindrical rollers, and the like) positioned between the inner race 148 and an outer race 152. The other bearings described herein may also include races and roller elements.

The first bearing 146 further includes an opening 154 between the inner race 148 and the outer race 152 at an inner axial side as well as a shield 156 at an outer axial side. In this way, the bearing 146 is shielded on one side, to increase lubricant (e.g., oil) pressure build-up. In this way, both the clutch and the bearing may be effectively lubricated.

In the illustrated example, a second bearing 158 is further coupled to the shaft 112. However, in other examples, the second bearing may be omitted from the transmission.

The transmission system 100 further includes a first hydraulic passage 160 that is routed through shaft 112 and delivers lubricant (e.g., oil) to the first friction clutch 106 as well as a second hydraulic passage 162 that is also routed through the shaft 112 and delivers lubricant to the second friction clutch 128. The first and second hydraulic passages 160 and 162 are fluidly separated to allow for independent clutch actuation. The hydraulic passages 160 and 162 include outlets 164 and 166, respectively that open into the first friction clutch 106 and the second friction clutch 128. To elaborate, the outlets 164 and 166 may extend radially through the shaft in a location between the splines that attach the clutch discs to the shaft 112.

Lubricant may be supplied to the first hydraulic passage 160 and the second hydraulic passages 162 via a first upstream hydraulic system component 168 and a second upstream hydraulic system component 170, as indicated via arrows, respectively. The hydraulic system may include one or more pumps, filters, valves, and the like designed to control the flow of lubricant to the friction clutches 106, 128.

The upstream hydraulic system components 168 and 170 may include one or more hydraulic pump(s) and/or actuator(s). To induce clutch actuation, the upstream hydraulic system components 168 and 170 are operated to provide pressurized fluid to the hydraulic passages 160 and 162, respectively. Consequently, during actuation the first friction clutch 106 and the second friction clutch 128 selectively receive pressurized fluid through the outlets 164 and 166 and the pressure in the selected clutch pack prevents relative rotation between the shaft and the selected gear.

The vehicle 104 further includes a control system 190 with a controller 191 as shown in FIG. 1. The controller 191 may include a microcomputer with components such as a processor 192 (e.g., a microprocessor unit), input/output ports, an electronic storage medium 193 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 191 may receive various signals from sensors 194 coupled to various regions of the vehicle 104 and/or transmission 102. For example, the sensors 194 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. An input device 195 (e.g., accelerator pedal, brake pedal, drive mode selector, combinations thereof, and the like) may further provide input signals indicative of an operator's intent for vehicle control.

Upon receiving the signals from the various sensors 194 of FIG. 1, the controller 191 processes the received signals, and employs various actuators 196 of vehicle components to adjust the components based on the received signals and instructions stored on the memory of controller 191. For example, the controller 191 may receive or generate a shift request/command. In response, the controller 191 may command operation of clutches 106 and 128 to powershift between a higher gear and a lower gear. During a powershift event, one clutch is engaged while the other clutch is disengaged to enable a smooth torque hand off. The other controllable components in the vehicle may function in a similar manner with regard to sensor signals, control commands, and actuator adjustment, for example.

An axis system 199 is provided in FIG. 1, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
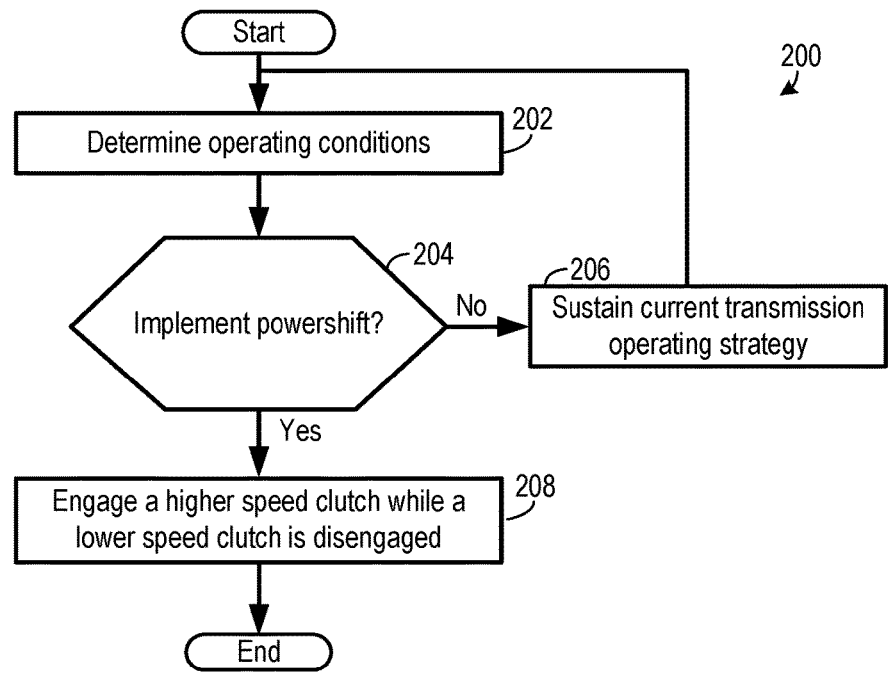
FIG. 2 is a transmission system operating method.

FIG. 2 shows a method 200 for operation of a transmission system. The method 200 may be carried out by the transmission system described herein with regard to FIG. 1. However, the method 200 may be carried via other suitable transmissions, in other examples. Furthermore, the method 200 may be implemented by a controller that includes a processor and memory, as previously discussed.

At 202, the method includes determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and other suitable techniques.

Next at 204, the method includes judging if a powershift in the transmission should be implemented. Such as determination may be carried out responsive to vehicle speed surpassing a threshold value, in one example. In other examples, operator interaction with gear selector may trigger a powershift.

If it is determined that a powershift should not occur (NO at 204) the method moves to 206 where the method includes sustaining the current transmission operating strategy. For instance, the transmission may be maintained in a lower gear.

Conversely, if it is determined that a powershift should occur (YES at 204) the method moves to 208 where the method includes engaging a higher speed clutch while disengaging a lower speed clutch while power delivery from a prime mover (e.g., a combustion engine, a traction motor, combinations thereof, and the like) to the transmission is sustained to transition from a lower gear to a higher gear. In this way, the shift may occur with little or no power interruption, if wanted. It will also be understood that the lubrication system may be continuously operated during implementation of method 200. As such, the method may include steps related to operation of the lubrication system such as transferring lubricant to a scavenger pump via a pick-up tube which is positioned in the sump of the transmission. In this way, lubricant can be removed from the transmission to reduce churning losses, if wanted.

Figure 3:
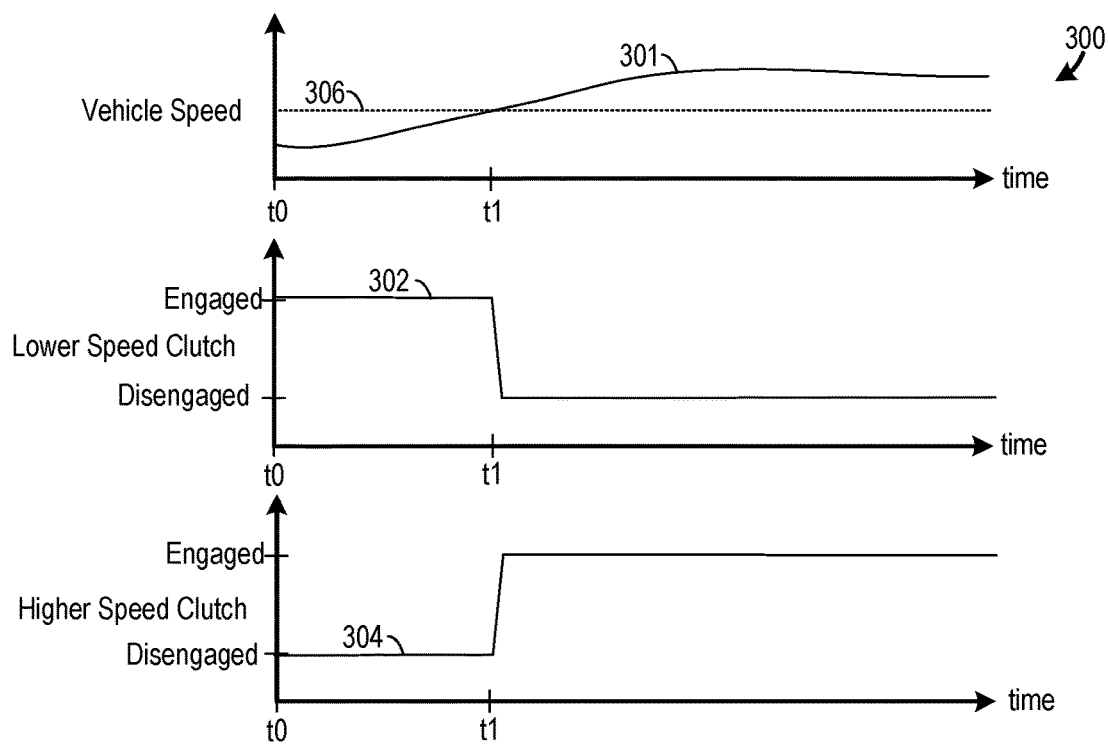
FIG. 3 is a timing diagram for a use-case transmission system control strategy.

FIG. 3 illustrates a timing diagram 300 of a use-case control strategy for a transmission system, such as any of the previously described transmissions or combinations of the transmissions. In each graph, time is indicated on the abscissa and increases from left to right. The ordinate for plot 301 indicates vehicle speed. The ordinates for plots 302 and 304 indicate the operational states ("Engaged" and "Disengaged") of the lower and higher speed clutches.

From t0 to t1 the vehicle speed increases and at t1 the speed surpasses a threshold value 306. Responsive to the vehicle speed surpassing the threshold value a powershifting event occurs where the lower speed clutch transitions into a disengaged state and the higher speed clutch transitions into an engaged state. It will be understood that the specific clutch control strategy may be more nuanced, in practice. For instance, clutch pressure in the second friction clutch may be less abruptly ramped up to allow a smoother transition into the second gear to occur and reduce the likelihood of unwanted noise, vibration, and harshness (NVH).

The technical effect of the transmission system operating method is to rapidly shift between transmission operating gears using a space efficient gear and friction clutch arrangement which is axially more compact than previous friction clutches.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises: a first friction clutch including: a first set of discs splined to a shaft; and a second set of discs splined to an inner circumference of a first gear; and a first hydraulic passage extending through the shaft and including an outlet in the shaft that directly supplies a lubricant to the first and second sets of discs during transmission system operation; wherein the first gear includes outer teeth that are positioned circumferentially around the first gear outward from the first and second sets of discs and is designed to mesh with a second gear in the transmission system.

In another aspect, a method for operation of a transmission system is provided that comprises, in a first friction clutch, selectively transferring mechanical power directly from a first set of discs splined to a shaft to a second set of discs splined to an inner circumference of a first gear; wherein the first gear includes outer teeth that are positioned circumferentially around the first gear outward from the first and second sets of discs and is designed to mesh with a second gear in the transmission system. In one example, the method may further comprise, in a second friction clutch, selectively transferring mechanical power directly from a third set of discs splined to the shaft to a fourth set of discs splined to an inner circumference of a third gear. In another example, the method may further comprise flowing a lubricant through a first hydraulic passage that extends through the shaft and including an outlet that supplies the lubricant to the first and second sets of discs; and flowing the lubricant through the first hydraulic passage extending through the shaft and including an outlet that supplies the lubricant to the third and fourth sets of discs.

In yet another aspect, a multi-speed transmission system in a vehicle is provided that comprises a first friction clutch including: a first set of discs splined to a shaft; and a second set of discs splined to an inner circumference of a first gear; and a second friction clutch including: a third set of discs splined to a shaft; and a fourth set of discs splined to an inner circumference of a second gear; wherein the first gear includes outer teeth that are positioned circumferentially around the first gear outward from the first and second sets of discs; wherein the third gear includes outer teeth that are positioned circumferentially around the third gear outward from the third and fourth sets of discs; and wherein the first and second gears have different sizes.

In any of the aspects or combinations of the aspects, selectively transferring the mechanical power from the first set of discs to the second set of discs may include hydraulically engaging to clutch via a hydraulic actuator.

In any of the aspects or combinations of the aspects, the transmission system may further comprise a second friction clutch including: a third set of discs splined to a shaft; and a fourth set of discs splined to an inner circumference of a third gear; and a second hydraulic passage extending through the shaft and supplying a lubricant to the third and fourth sets of discs during transmission system operation; wherein the second gear includes outer teeth that are positioned circumferentially around the second gear outward from the third and fourth sets of discs and is designed to mesh with fourth second gear in the transmission system.

In any of the aspects or combinations of the aspects, the first gear and the third gear may have different sizes.

In any of the aspects or combinations of the aspects, the transmission system may further comprise a bearing coupled to the shaft and including an axial side that is adjacent to an axial side of the first friction clutch, wherein the bearing includes a shield on an outer axial side of the bearing.

In any of the aspects or combinations of the aspects, the bearing may be a ball bearing.

In any of the aspects or combinations of the aspects, the first gear may include a first wall and a second axial wall that axially bound the second set of discs.

In any of the aspects or combinations of the aspects, the shaft may include an input gear that is rotationally coupled to an electric motor.

In any of the aspects or combinations of the aspects, selectively transferring the mechanical power from the first set of discs to the second set of discs may include transitioning the first friction clutch from a disengaged state to an engaged state during a shift event.

In any of the aspects or combinations of the aspects, selectively transferring the mechanical power from the first set of discs to the second set of discs may include hydraulically actuating the first friction clutch via an actuator piston that is hydraulically coupled to a hydraulic passage routed through the shaft.

In any of the aspects or combinations of the aspects, the transmission system may further comprise a first oil passage routed through shaft and supplying oil to the first friction clutch; and a second oil passage fluidly separated from the first oil passages, routed through the shaft, and supplying oil to the second friction clutch.

In any of the aspects or combinations of the aspects, the first oil passage may include an outlet that extends axially outward through the splines in the shaft.

In any of the aspects or combinations of the aspects, the transmission system may further include a pair of bearings coupled to the shaft axially outward from and adjacent to the first friction clutch and the second friction clutch, wherein the bearings each include a shield an outer axial side of the corresponding bearing and position between an inner and outer race.

In any of the aspects or combinations of the aspects, the first gear may include a first wall and a second wall that axially bound the second set of discs and wherein the second wall is in face sharing contact with one of the bearings in the pair of bearings.

In any of the aspects or combinations of the aspects, the transmission system may further include a controller including instructions stored in non-transitory memory that when executed cause the controller to: engage the first friction clutch while disengaging the second friction clutch.

In any of the aspects or combinations of the aspects, the first friction clutch and the second friction clutch may be hydraulically actuated via fluidly separated passages that are routed through the shaft.

In any of the aspects or combinations of the aspects, teeth of the first gear may extend directly radially outward from a body of the first gear that includes the first wall and the second wall.

In another representation, a multi-clutch system is provided that comprises a first wet friction clutch incorporated into a body of a first gear and a shaft and a second wet friction clutch incorporated into a body of a second gear and a shaft, wherein the first and second gears having different sizes and mesh with associated gears.

Note that the example control and estimation routines included herein can be used with various powertrain and/or transmission system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
 a first friction clutch including:
  a first set of discs directly splined to a shaft; and
  a second set of discs splined to an inner circumference of a first gear;

a first hydraulic passage extending through the shaft and including an outlet in the shaft that directly supplies a lubricant to the first and second sets of discs during transmission system operation; and a bearing coupled to the shaft and including an inner axial side which includes an opening that is formed between an inner race and an outer race and is directly adjacent to an axial side of the first friction clutch;

wherein the bearing includes a shield on an outer axial side of the bearing; and wherein the first gear includes outer teeth that are positioned circumferentially around the first gear outward from the first and second sets of discs and is designed to mesh with a second gear in the transmission system, wherein the shaft includes an input gear that is rotationally coupled to an electric motor.

2. The transmission system of claim 1, further comprising:
a second friction clutch including:
a third set of discs splined to a shaft; and
a fourth set of discs splined to an inner circumference of a third gear; and
a second hydraulic passage extending through the shaft and supplying a lubricant to the third and fourth sets of discs during transmission system operation;
wherein the third gear includes outer teeth that are positioned circumferentially around the third gear outward from the third and fourth sets of discs and is designed to mesh with fourth second gear in the transmission system.

3. The transmission system of claim 2, wherein the first gear and the third gear have different sizes.

4. The transmission system of claim 1, wherein the bearing is a ball bearing.

5. The transmission system of claim 1, wherein the first gear includes a first wall and a second axial wall that axially bound the second set of discs.

6. A method for operation of a transmission system, comprising:
in a first friction clutch, selectively transferring mechanical power directly from a first set of discs directly splined to a shaft to a second set of discs splined to an inner circumference of a first gear; and
flowing a lubricant directly from the first friction clutch to an opening that is formed on an inner axial side of a bearing between an inner race and an outer race of the bearing;
wherein the bearing includes a shield on an outer axial side of the bearing; and
wherein the first gear includes outer teeth that are positioned circumferentially around the first gear outward from the first and second sets of discs and is designed to mesh with a second gear in the transmission system.

7. The method of claim 6, wherein selectively transferring the mechanical power from the first set of discs to the second set of discs includes hydraulically engaging to clutch via a hydraulic actuator.

8. The method of claim 6, further comprising, in a second friction clutch, selectively transferring mechanical power directly from a third set of discs splined to the shaft to a fourth set of discs splined to an inner circumference of a third gear.

9. The method of claim 8, further comprising:
flowing a lubricant through a first hydraulic passage that extends through the shaft and including an outlet that supplies the lubricant to the first and second sets of discs; and
flowing the lubricant through the first hydraulic passage extending through the shaft and including an outlet that supplies the lubricant to the third and fourth sets of discs.

10. The method of claim 6, wherein selectively transferring the mechanical power from the first set of discs to the second set of discs includes transitioning the first friction clutch from a disengaged state to an engaged state during a shift event.

11. The method of claim 6, wherein selectively transferring the mechanical power from the first set of discs to the second set of discs includes hydraulically actuating the first friction clutch via an actuator piston that is hydraulically coupled to a hydraulic passage routed through the shaft.

12. A multi-speed transmission system in a vehicle, comprising:
a first friction clutch including:
a first set of discs directly splined to a shaft; and
a second set of discs splined to an inner circumference of a first gear;
a bearing coupled to the shaft and including an inner axial side which includes an opening that is formed between an inner race and an outer race and is directly adjacent to an axial side of the first friction clutch; and
a second friction clutch including:
a third set of discs splined to the shaft; and
a fourth set of discs splined to an inner circumference of a second gear;
wherein the bearing includes a shield on an outer axial side of the bearing;
wherein the first gear includes outer teeth that are positioned circumferentially around the first gear outward from the first and second sets of discs;
wherein the second gear includes outer teeth that are positioned circumferentially around the second gear outward from the third and fourth sets of discs; and
wherein the first and second gears have different sizes.

13. The multi-speed transmission system of claim 12, further comprising:
a first oil passage routed through shaft and supplying oil to the first friction clutch; and
a second oil passage fluidly separated from the first oil passages, routed through the shaft, and supplying oil to the second friction clutch.

14. The multi-speed transmission system of claim 13, wherein the first oil passage includes an outlet that extends axially outward through the splines in the shaft.

15. The multi-speed transmission system of claim 14, wherein teeth of the first gear extend directly radially outward from a body of the first gear that includes the first wall and the second wall.

16. The multi-speed transmission system of claim 12, further comprising:
a controller including instructions stored in non-transitory memory that when executed cause the controller to:
engage the first friction clutch while disengaging the second friction clutch.

* * * * *